UNITED STATES PATENT OFFICE.

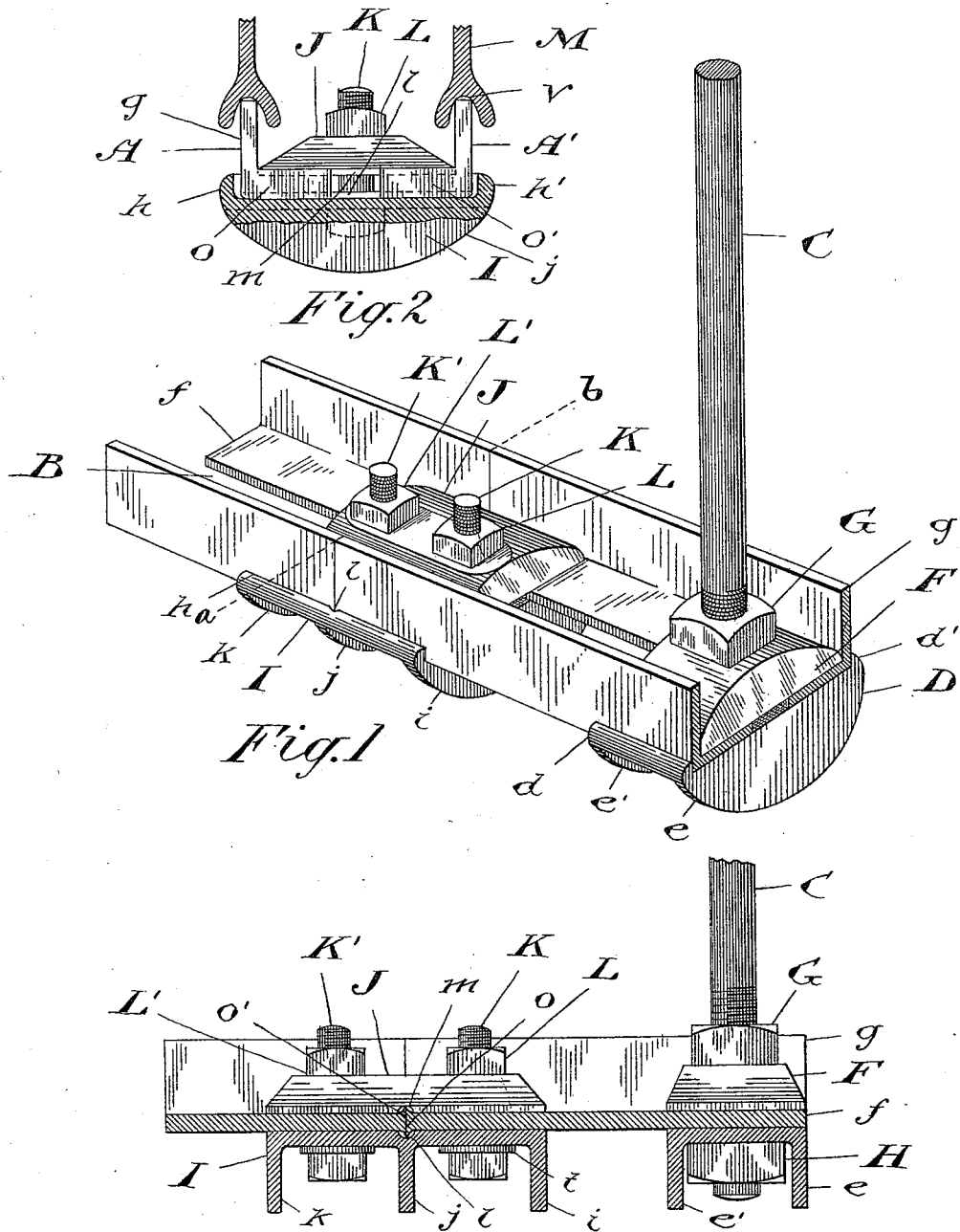

JAMES W. PROVAN, OF OSHAWA, CANADA.

HAY-CARRIER TRACK.

SPECIFICATION forming part of Letters Patent No. 526,052, dated September 18, 1894.

Application filed June 6, 1894. Serial No. 513,672. (No model.)

*To all whom it may concern:*

Be it known that I, JAMES WHITE PROVAN, of the town of Oshawa, in the county of Ontario and Province of Ontario, Canada, have invented a certain new and Improved Hay-Carrier Track, of which the following is a specification.

The object of the invention is to construct a hay carrier track suitable for a hay carrier having four grooved wheels, whereby the wheels are enabled to run with less than usual friction, and are not liable to be displaced from the track when any unusual strain is brought to bear on the carrier, which can also be readily constructed, affording means for quickly adjusting in place the clips, hangers and stop blocks, and it consists, essentially, of two L-shaped rails, the horizontal flanges of which are held in juxtaposition so as to form a continuous slot through which the end of the hangers may pass and be secured in place by means of lipped clips placed beneath the rails, to which clips the horizontal flanges of the L-shaped rails are applied, a washer preferably rectangular, through which the hanger also passes, placed on top of the horizontal flanges of the L-shaped rails to keep the rails sufficiently far apart to form the continuous slot, and more particularly to keep the track in shape and to prevent any twisting of the rails, a lower non-rotatable nut on the end of the hanger between vertical ribs on the clip, and an upper nut on the hanger to bind the washer, rails and lipped clip together, the grooved wheels of the carrier running on the vertical flanges of the rails, as hereinafter described.

It also consists in a connecting lipped clip applied to the bottom of the horizontal flanges at the end of the adjoining L-shaped rails, a washer on top of the horizontal flanges of the L-shaped rails covering the joint between the horizontal flanges of the rails, transverse grooves formed on the faces of the connecting clips and the washers to receive the upset ends of the horizontal flanges of the L-shaped rails, and bolts binding the washer, the connecting clip and the ends of the rails together, substantially as hereinafter set forth.

Figure 1, is a perspective view of the track. Fig. 2, is a cross-section through *a—b*, in Fig. 1. Fig. 3, is a longitudinal sectional elevation of the track.

In the drawings, like letters of reference indicate corresponding parts in the different figures.

In Fig. 1,—A, A', are L-shaped rails having vertical flanges *g*, and horizontal flanges *f*. The edges of the horizontal flanges *f*, are held at a predetermined distance from each other by means of washers and clips, hereinafter referred to, so as to form between them a continuous slot B.

C, is a hanger which may be hooked at its upper end so as to engage with a hole formed in brackets attached to the rafters of the building. The hanger C, passes through a washer F, which is preferably rectangular and rests on the horizontal flanges *f*, of the L-shaped rails, the sides butting against the vertical flanges thereof.

D, is a clip placed under the horizontal flanges *f*, of the L-shaped rails, and lipped at *d, d'*, so as to engage with the outer angle of the L-shaped rails, and *e, e'*, are transverse ribs formed on the lipped clip D, designed for strengthening purposes as well as to prevent the lower nut H, from turning when the hanger with this nut at its lower end is in position. The hanger passes through holes formed in the washer F, and the lipped clip D; the washer, the lipped clip and L-shaped rails being clamped together by means of the clamping nut G, on the threaded end of the hanger C, and the lower nut H.

I, is a connecting clip placed underneath the horizontal flanges of the L-shaped rails at a joint between adjoining rails, and *h, h'*, are lips formed on the connecting clip and engaging with the outer angle of the L-shaped rails. On this connecting clip are formed transverse ribs *i, j, k*, for strengthening purposes.

J, is a connecting washer placed on the upper side of the horizontal flanges *f*, covering the joint between the adjoining rails immediately opposite to the connecting clip.

K, K', are bolts which pass through the connecting clip I, and connecting washer J, and clamp these latter to the L-shaped rails by means of the nuts L, L'.

*l*, is a transverse groove formed in the connecting clip.

In Fig. 2, is shown the grooved wheels M, of the carrier, grooved at v, and resting on the upper edge of the vertical flanges g, of the L-shaped rails.

m, is a transverse groove formed in the connecting washer J; o, o', the upset ends of the horizontal flanges of the L-shaped rails adjoining each other at the joint and which are adapted to engage with the transverse slots l, and m, (see Figs. 2 and 3) so as to hold the ends of the rails more securely together against longitudinal strain.

Fig. 3, represents from another point of view the upset ends of the rails o, o', engaging with the transverse groove m, in the connecting washer J, and the transverse groove l, in the connecting clip I. It also shows between the heads of the bolts K, K', and the connecting clip, washers t.

By means of this special construction, I am enabled to form a strong and rigid hay carrier track which is adapted to keep well in alignment under any loads to which it may be subjected.

Owing to the fact that the L-shaped rails are independent rails, instead of being formed in one piece and that a continuous slot is left between the edges of their horizontal flanges through which the hangers and bolts may pass, all punching of slots or holes in the rails is obviated, and it is possible to roll the rails and turn them out economically in a completed form.

Instead of the hangers being attached, as shown in the drawings, they may be connected to the L-shaped rails at the place occupied by either of the bolts K, K', between the joints of adjoining rails.

What I claim as my invention is—

1. In a hay carrier, two rails arranged parallel to each other and having a continuous slot between their horizontal flanges, and means for securing said rails together, the connecting bolts of said securing means passing through said slot, whereby punching and drilling of the holes in the rails are avoided, substantially as described.

2. In a hay carrier, two rails arranged parallel to, and a predetermined distance from, each other, thus forming a continuous slot between their horizontal flanges, and a hanger secured to said rails by passing through said slot and having a nut on each side of said rails, thus securing the hanger to the rails, at any point, without punching or drilling holes in the rails, substantially as described.

3. In a hay carrier track, two L-shaped rails arranged parallel to each other and having the edges of their horizontal flanges held in juxtaposition so as to form a continuous slot, in combination with a lipped clip beneath said rails engaging with the vertical flanges of the L-shaped rails, a rectangular washer resting on the horizontal flanges of the rails, and butting against their vertical flanges, a hanger passing through holes formed in the washer, the lipped clip and the continuous slot, and upper binding nut and a lower non-rotatable nut, substantially as and for the purpose specified.

4. In a hay carrier track, two L-shaped rails arranged parallel to each other, and having the edges of their horizontal flanges held in juxtaposition so as to form a continuous slot, in combination with a lipped clip beneath the L-shaped rails and a washer on top of the horizontal flanges of the said rails and butting against the vertical flanges thereof and a hanger, the whole being clamped together, substantially as and for the purpose specified.

5. In a hay carrier track, a lipped clip applied to the under side of the horizontal flanges of two L-shaped rails and engaging with the vertical flanges thereof, in combination with the two L-shaped rails, and a washer between the vertical flanges of said rails and on top of the horizontal flanges thereof, and a hanger, the whole being clamped together, substantially as and for the purpose specified.

6. In a hay carrier, two L-shaped rails arranged parallel to each other with a continuous slot between their horizontal flanges, and a hanger passing through said slot, in combination with a lipped clip, engaging with the outside angle of each rail, a nut on the end of the hanger held from turning by a transverse rib formed on the lipped clip, a washer resting on the horizontal flanges of the L-shaped rails and butting against the vertical flanges of the rails, and an upper clamping nut on top of the washer, substantially as and for the purpose specified.

7. In a hay carrier track, a connecting clip applied to the bottom of the horizontal flanges at the ends of adjoining L-shaped rails, and having lips adapted to engage with the vertical flanges at the outside angle of said rails, in combination with the L-shaped rails, a connecting washer covering the joint between said rails and resting on their horizontal flanges, and bolts and nuts binding the rails, the connecting washer and connecting clip together, substantially as and for the purpose specified.

8. In a hay carrier track, a connecting clip applied to the bottom of the horizontal flanges at the ends of adjoining L-shaped rails and having lips adapted to engage with the vertical flanges at the outside angle of said rails, a transverse groove being formed in the seat of said connecting clip, in combination with L-shaped rails having the ends of their horizontal flanges upset, a connecting washer covering the joint between said rails and resting on their horizontal flanges, and bolts and nuts binding the rails, the connecting washer and connecting clip together, substantially as and for the purpose specified.

9. In a hay carrier track, a connecting clip applied to the bottom of the horizontal flanges at the ends of adjoining L-shaped rails, and having lips adapted to engage with the vertical flanges at the outside angle of said rails, a transverse groove being formed in the seat of said connecting clip, in combination with L-shaped rails having the ends of their horizontal flanges upset, a connecting washer covering the joint between said rails and resting on their horizontal flanges, and a transverse groove being formed on the bottom of said washer, and bolts and nuts binding the rails, the connecting washer and connecting clip together, substantially as and for the purpose specified.

10. A hay carrier track comprising the following elements:—L-shaped rails A, A′, having horizontal flanges $f$ and vertical flanges $g$, arranged parallel and at a predetermined distance from each other; a hanger C; lipped clips D, having lips $d, d'$, and ribs $e, e'$; washers F; upper clamping bolts G; under non-rotatable bolts H; the ribbed and lipped connecting clips I; transverse grooves $l$; connecting washers J, transverse grooves $m$, on connecting washers; upset ends of horizontal flanges $o, o'$; bolts K, K′; nuts L, L′, substantially as and for the purpose specified.

Toronto, May 30, 1894.

JAMES W. PROVAN.

In presence of—
A. M. NEFF,
FRED CLARKE.